United States Patent [19]
Brückner et al.

[11] Patent Number: 5,873,234
[45] Date of Patent: Feb. 23, 1999

[54] METHOD OF COOLING THE COOLANT OF A GAS TURBINE, AND APPARATUS PERFORMING THE METHOD

[75] Inventors: Hermann Brückner, Uttenreuth; Erich Schmid, Marloffstein, both of Germany

[73] Assignee: Siemens Aktiengesellschaft, Munich, Germany

[21] Appl. No.: 883,153

[22] Filed: Jun. 27, 1997

Related U.S. Application Data

[63] Continuation of PCT/DE95/01793 Dec. 14, 1995.

[30] Foreign Application Priority Data

Dec. 27, 1994 [DE] Germany ................ P 44 46 862.8

[51] Int. Cl.[6] .................................................. F02C 6/00
[52] U.S. Cl. .................... 60/39.02; 60/39.182; 60/728
[58] Field of Search ................ 60/39.02, 39.182, 60/728; 417/151; 122/7 R, 7 B

[56] References Cited

U.S. PATENT DOCUMENTS 3,686,867 8/1972 Hull ............................................. 60/94
4,445,325 5/1984 Tratz ...................................... 60/39.182
5,285,627 2/1994 Losel et al. ........................... 60/39.182
5,404,708 4/1995 Sigling et al. ........................ 60/39.182
5,491,971 2/1996 Tomlinson et al. .................. 60/39.182

FOREIGN PATENT DOCUMENTS 2 264 539   9/1993   United Kingdom .

Primary Examiner—Timothy Thorpe
Assistant Examiner—Ted Kim
Attorney, Agent, or Firm—Herbert L. Lerner; Laurence A. Greenberg

[57] ABSTRACT

Adequate cooling of the coolant of a gas turbine of a gas and steam turbine system is assured under all operating conditions, and especially in peak-load operation. The coolant of the gas turbine is cooled by heat exchange with a medium circulating in a separate evaporator loop connected to the steam drum. The cooling capacity is adapted to the operating state of the gas and steam turbine system. An injector connection is provided between a feedwater delivery pipe and the separate evaporator loop.

10 Claims, 1 Drawing Sheet

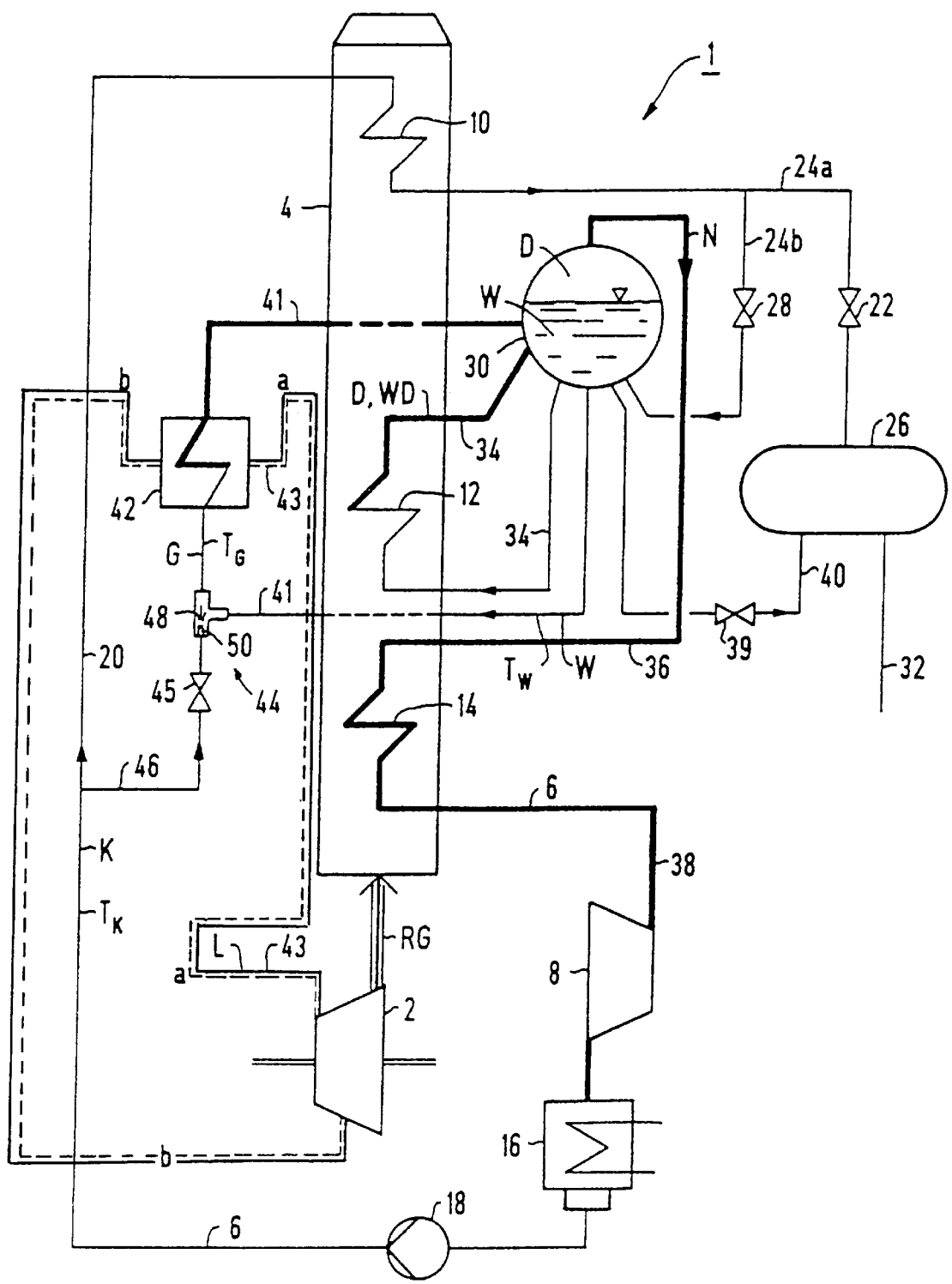

ved. The coolant temperature difference, since the coolant temperature is now adjusted to some extent independently from the temperature of the circulating medium of the separate evaporator loop.

METHOD OF COOLING THE COOLANT OF A GAS TURBINE, AND APPARATUS PERFORMING THE METHOD

CROSS-REFERENCE TO RELATED APPLICATION

This application is a continuation of copending international application PCT/DE95/01793, filed Dec. 14, 1995, which designated the United States.

BACKGROUND OF THE INVENTION

Field of the Invention

The invention relates to a method for cooling the coolant of a gas turbine of a gas and steam turbine system having a first evaporator loop that includes a steam drum. The invention also pertains to an apparatus for cooling the coolant of a gas turbine of a gas and steam turbine system, for performing such a method.

Gas and steam turbine systems are typically used to generate electrical energy. Operating medium carried in an evaporator loop of the steam turbine system, typically a water-water/steam mixture, is evaporated in an evaporator, and the steam thus produced is used for generating energy.

In an evaporator loop of the natural circulation type, partial evaporation of the operating medium supplied is effected in the evaporator, and a circulation of the operating medium is assured by means of pressure differences arising in the evaporation process and/or by the geodetic disposition of the evaporator and the steam drum. Alternatively, the evaporator loop may also involve forced circulation, in which the circulation of the operating medium is assured by a recirculating pump, and the operating medium again evaporates at least partially in the evaporator. Both in natural and in forced circulation, the water-water/steam mixture from the evaporator is delivered to a steam drum connected into the evaporator loop. In the steam drum, water and steam are separated, and from the steam drum the water is redelivered to the evaporator.

Complete evaporation with ensuing partial superheating of the operating medium in one pass through the evaporator is effected where the evaporator loop involves forced once-through passage, in which the passage of the operating medium is again assured by means of pumps.

Regardless of whether natural circulation, forced circulation or the forced once-through principle is used in the steam turbine system, the goal—in order to increase the capacity of the gas turbine and hence to attain the highest possible efficiency of such a gas and steam turbine system—is an especially high temperature of the propellant gas at the inlet of the gas turbine, for example of from 1000° to 1200° C.

This kind of high turbine inlet temperature, however, entails material problems, particularly with respect to the heat resistance of the turbine blades.

Increasing the turbine inlet temperature can be allowed whenever the turbine blades are cooled enough that they always have a temperature below the allowable material temperature. To that end, it is known from European Patent EP 0 379 880 to divert air, compressed in a compressor assigned to the gas turbine, and to cool this air, acting as a coolant, before it enters the gas turbine. The heat extracted from the cooling air in the cooling process can be used for instance as heat of evaporation and can be used to drive the steam turbine. A flash evaporator with a recirculating pump and an expansion vessel is then used as the evaporator system. Water is drawn from the steam drum of the evaporator loop; this water is heated by heat exchange with the cooling air acting as coolant for the gas turbine and is then evaporated by expansion in the expansion vessel. The steam thus produced is supplied to the steam turbine.

Such an apparatus for cooling the cooling air of a gas turbine is designed for a particular temperature difference between the water drawn from the steam drum and the cooling air. For example, if because of peak-load operation or the withdrawal of process steam the process in the evaporator loop and hence the water temperature in the steam drum rise, then the temperature of the cooling air of the gas turbine rises as well. Hence cooling of the cooling air to the temperature necessary for cooling the gas turbine is practically no longer assured, which can cause failure of the gas turbine.

Gas turbines whose coolant is recoolable in a heat exchanger, wherein the temperature of the coolant is variable, are known from U.S. Pat. No. 4,891,937 (corresp. EP 0 106 313) and from U.S. Pat. No. 5,255,505 (corresp. GB 226 45 39).

SUMMARY OF THE INVENTION

It is accordingly an object of the invention to provide a method of cooling the coolant of a gas turbine of a gas and steam turbine system having an evaporator loop including a steam drum, and an apparatus for performing the method, which overcomes the above-mentioned disadvantages of the prior art devices and methods of this general type and which assures adequate cooling of the gas turbine under all operating conditions in an especially easy way.

With the foregoing and other objects in view there is provided, in accordance with the invention, a method of cooling a coolant in a gas turbine of a gas and steam turbine system, the system having a first evaporator loop including a steam drum, the method which comprises: providing a second evaporator loop communicating with the steam drum, circulating a medium in the second evaporator loop, and cooling the coolant by heat exchange with the medium circulating in the second evaporator loop; injecting condensate into the second evaporator loop for varying a temperature of the medium circulating in the second evaporator loop and adjusting a temperature of the coolant of the gas turbine.

In other words, the temperature of the coolant is adjusted by varying parameters that determine the heat exchange, in particular by varying the temperature of the medium circulating in the second or separate evaporator loop. The adjustment of the coolant temperature is thereby effected by injecting condensate into the separate evaporator loop.

The cooling of the coolant of the gas turbine is accordingly adapted not only for a certain temperature difference between the coolant of the gas turbine and the coolant that cools the coolant.

The invention is based on the concept that by varying parameters that influence the heat exchange, and in particular by varying the temperature of the medium circulating in the separate evaporator loop, the cooling of the gas turbine coolant can be adapted to any arbitrary operating state of the gas and steam turbine system. Thus the temperature of the gas turbine coolant can be held to a value which is adequate for cooling the gas turbine, regardless of the temperature difference between the coolant and the circulating medium.

It has been found that by injecting condensate into the separate evaporator loop, the temperature of the medium circulating in the separate evaporator loop and hence the temperature of the gas turbine coolant as well can be adjusted especially effectively over a wide range. In particular a high temperature difference between the injected condensate and the medium circulating in the separate evaporator loop provides an effective possibility of varying the parameters that determine the heat exchange. The feeding of the condensate into the separate evaporator loop by injection moreover, because of the jet or suction action of the injection, reinforces the circulation of the medium in the separate evaporator loop or induces the circulation upon startup. Even in peak-load operation of the gas and steam turbine system, adequate cooling of the gas turbine coolant is assured, and nearly the entire quantity of condensate present in the water-steam loop of the gas and steam turbine system can be injected into the separate evaporator loop.

In accordance with an added feature of the invention, overfeeding of the steam drum with condensate injected into the separate evaporator loop is avoided in that excess water is drained out of the steam drum into the feedwater container of the gas and steam turbine system.

The separate evaporator loop may operate by natural circulation, by forced circulation, or by forced once-through flow. In each case, the heat extracted from the gas turbine coolant by cooling can be delivered to the steam generating process of the gas and steam turbine system.

With the above and other objects in view, there is further provided, in accordance with the invention, an apparatus in a coolant-cooled gas turbine of a gas and steam turbine system, the system having a first evaporator loop with a steam drum and a feedwater delivery pipe connected to the steam drum, for cooling the coolant of the gas turbine. The apparatus comprises a second evaporator loop communicating with the steam drum; a heat exchanger having a primary side connected in the second evaporator loop and a secondary side communicating with a coolant supply of a gas turbine; and an injector connection communicating between the feedwater delivery pipe and the second evaporator loop.

In other words, the novel features of the invention are found in that condensate is injected into the separate evaporator loop and hence the temperature of the coolant that cools the gas turbine coolant is varied.

In accordance with an additional feature of the invention, there is provided a throttle or valve connected in the injector connection for throttling and/or shutting off a flow in the injector connection.

In accordance with a concomitant feature of the invention, there is provided a feedwater container and a drain line connecting the feedwater container to the steam drum for draining excess water from the steam drum. Further, a valve is provided for shutting off a flow in the drain line.

The advantages attained with the invention are in particular that by cooling the gas turbine coolant by heat exchange with a medium circulating in a separate evaporator loop connected to the steam drum, and because of the possible feeding of condensate if needed into the separate evaporator loop, the cooling of the gas turbine coolant is assured in all operating states of the gas and steam turbine system. In particular, proper cooling is assured in peak-load operation. Such an apparatus for cooling the gas turbine coolant can be designed optimally in terms of efficiency criteria for rated load operation of the gas and steam turbine system, without requiring an uneconomical over-dimensioning for peak-load operation. The cooling of the gas turbine coolant, especially in peak-load operation, is assured in that it is possible to adjust the temperature of a medium circulating in the separate evaporator loop by means of the condensate injection, so that such a gas and steam turbine system can be operated especially flexibly and inexpensively. Moreover, when the gas turbine is started, with a rapidly rising heat input, it is possible to immediately attain proper flow of medium in the separate evaporator loop and through the heat exchanger, such as by forced flow. The immediately proper flow affects the startup behavior of the evaporator system quite favorably.

Other features which are considered as characteristic for the invention are set forth in the appended claims.

Although the invention is illustrated and described herein as embodied in a method of cooling the coolant of a gas turbine of a gas and steam turbine system having an evaporator loop including a steam drum, and an apparatus for performing the method, it is nevertheless not intended to be limited to the details shown, since various modifications and structural changes may be made therein without departing from the spirit of the invention and within the scope and range of equivalents of elements of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The sole FIGURE is a schematic of a gas and steam turbine system with an apparatus for cooling the gas turbine coolant.

DESCRIPTION OF THE PREFERRED EMBODIMENTS

Referring now to the FIGURE of the drawing in detail, there is seen a gas and steam turbine system 1, which includes a gas turbine 2 with waste heat steam generators 4 connected downstream on the gas side, whose heating surfaces are incorporated into a water-steam loop 6 of a steam turbine 8. The heating surfaces are a low-pressure preheater 10, a low-pressure evaporator 12, and a low-pressure superheater 14.

The steam turbine 8 is followed downstream by a condenser 16, which communicates with the low-pressure preheater 10 via a condensate pump 18 and a feedwater delivery pipe 20. The low-pressure preheater 10 communicates on the outlet side with a feedwater container 26, via a supply line 24a that can be blocked off with a valve 22, and parallel to the line 24a with a steam drum or water-steam separating container 30, via a line 24b that can be blocked off with a valve 28. A supply line 32 for supplying feedwater into a non-illustrated high-pressure evaporator region of the gas and steam turbine system 1 communicates with the outlet side of the feedwater container 26.

The steam drum 30 communicates on the steam and water sides with the low-pressure evaporator 12 incorporated into a first evaporator loop 34. The evaporator loop 34 is a natural circulation loop. However, it may also be a forced circulation or a forced once-through flow.

On the steam outlet side, the steam drum 30 communicates via a line 36 with the low-pressure superheater 14, which in turn communicates on the outlet side with the steam turbine 8 via a line 38. The steam drum 30 is also connected to the feedwater container 26, via a drain line 40 that can be blocked off with a valve 39.

A second or separate evaporator loop 41 is connected to the steam drum 30. The primary-side inlet of a heat exchanger 42 is incorporated into the separate evaporator loop 41. The separate evaporator loop 41 has natural circulation but can also have forced circulation or forced once-through flow. The heat exchanger 42 is incorporated on the secondary side into a coolant air line 43 that discharges into the gas turbine 2. At the points marked a and b of the coolant air line 43, communication exists with the gas turbine 2.

The feedwater delivery pipe 20 communicates with the separate evaporator loop 41 via an injector connection, which includes a connecting line 46 that can be blocked off with a valve and also includes an injector 48. The injector 48 has an injection nozzle 50.

In operation of the gas and steam turbine system 1, hot flue gas RG that is at high pressure and is created upon combustion in the gas turbine 2 is expanded in the gas turbine 2. The expanded flue gas RG is introduced into the waste heat steam generator 4 and is used there to generate steam for the steam turbine 8. Operating medium or water W located in the steam drum 30 is delivered to the low-pressure evaporator 12 via the evaporator loop 34 and there is converted entirely or partially into a water-steam mixture WD. The water-steam mixture WD is resupplied to the steam drum 30 in that the steam D is separated from the water W. Useful steam N drawn from the steam drum 30 is delivered via the line 36 to the low-pressure superheater 14, where it is superheated and then carried via the line 38 to the steam turbine 8, in which it expands. The expanded steam is carried into the condenser 16, where it condenses. Condensate thus produced is pumped via the condensate pump 18 in the feedwater delivery pipe 20 to the low-pressure preheater 10 and from there is delivered to the feedwater container 26 via the line 24a or to the steam drum 30 via the line 24b.

For cooling the gas turbine 2, coolant air L is supplied to the gas turbine via the line 43. To assure adequate cooling of the gas turbine 2 in this process, the temperature of the supplied coolant air L must not exceed a maximum value. This requires cooling of the coolant air L, which is achieved by heat exchange in the heat exchanger 42. The heat exchange in the heat exchanger 42 is effected with water W circulating in the separate evaporator loop 41 connected to the steam drum 30. To adjust the temperature of the coolant air L of the gas turbine 2, the parameters that determine the heat exchange of the coolant air L with the water W are variable. In particular, the flow rate of the water W circulating in the separate evaporator loop 41 may be throttled and adjusted. Moreover, the temperature $T_w$ of the medium W circulating in the separate evaporator loop 41 is adjustable.

To adjust this temperature $T_w$, condensate K is extracted from the feedwater delivery pipe 20, preferably via the connecting line 46 and the injector 48, and injected into the separate evaporator loop 41. The thus-extracted condensate K, at a temperature $T_k$ of about 40° C., is significantly cooler than the water W flowing out of the steam drum 30 into the separate evaporator loop 41, whose temperature $T_w$ is about 150° C. Because of the great temperature difference $\Delta T$ of the condensate K compared with the water W in the separate evaporator loop 41 that has been drawn from the steam drum 30, the temperature $T_G$ of the coolant medium G delivered to the heat exchanger 42, which is a mixture of condensate K and water W, is adjustable by means of the quantity of supplied condensate K. That quantity can be varied by means of the valve 45. Thus even the temperature of the coolant air L of the gas turbine 2, cooled by the heat exchange in the heat exchanger 42, is adjustable. In peak-load operation of the gas and steam turbine system 1, adequate cooling of the coolant air L of the gas turbine 2 is assured by increasing the injected quantity of condensate K into the separate evaporator loop 41.

By the injection of condensate K into the evaporator loop 41, the total quantity of operating medium, water W and steam D, circulating in the evaporator loops 34, 41 connected to the steam drum 30 is increased. Excess water W thereupon occurring in the steam drum 30 is drained off into the feedwater container 26 via the drain line 40.

Upon the injection of condensate K into the separate evaporator loop 41, a jet action is attained by means of the injection nozzle 50 of the injector 48. Because of the thus-attained entrainment effect and the attendant quasi-vacuum, the circulation of operating medium or water W in the separate evaporator loop 41 can be reinforced, or can be induced upon startup.

We claim:

1. A method of cooling a coolant in a gas turbine of a gas and steam turbine system, the system having a first evaporator loop including a steam drum, the method which comprises:

providing a second evaporator loop communicating with the steam drum, circulating a medium in the second evaporator loop, and cooling the coolant by heat exchange with the medium circulating in the second evaporator loop;

injecting condensate into the second evaporator loop for varying a temperature of the medium circulating in the second evaporator loop and adjusting a temperature of the coolant of the gas turbine.

2. The method according to claim 1, which further comprises providing a feedwater container communicating with the steam drum, and draining excess water out of the steam drum into the feedwater container.

3. The method according to claim 1, wherein the circulating step comprises circulating the medium in the second evaporator loop by natural circulation.

4. The method according to claim 1, wherein the circulating step comprises circulating the medium in the second evaporator loop by forced circulation.

5. The method according to claim 1, wherein the circulating step comprises circulating the medium in the second evaporator loop by forced once-through flow.

6. In a coolant-cooled gas turbine of a gas and steam turbine system, the system having a first evaporator loop with a steam drum and a feedwater delivery pipe connected to the steam drum, an apparatus for cooling the coolant of the gas turbine, comprising:

a second evaporator loop communicating with the steam drum;

a heat exchanger having a primary side connected in said second evaporator loop and a secondary side communicating with a coolant supply of a gas turbine; and an injector connection communicating between the feedwater delivery pipe and said second evaporator loop.

7. The apparatus according to claim 6, which comprises a throttle connected in said injector connection for throttling a flow in said injector connection.

8. The apparatus according to claim 6, which comprises a valve connected in said injector connection for shutting off a flow in said injector connection.

9. The apparatus according to claim 6, which further comprises a feedwater container and a drain line connecting said feedwater container to said steam drum for draining excess water from the steam drum.

10. The apparatus according to claim 9, which further comprises a valve in said drain line for shutting off a flow in said drain line.

* * * * *